United States Patent [19]

Yagi

[11] Patent Number: 5,168,159
[45] Date of Patent: Dec. 1, 1992

[54] BARRIER HEIGHT MEASURING APPARATUS INCLUDING A CONDUCTIVE CANTILEVER FUNCTIONING AS A TUNNELLING PROBE

[75] Inventor: Akira Yagi, Sagamihara, Japan

[73] Assignee: Olympus Optical Co., Ltd., Tokyo, Japan

[21] Appl. No.: 787,047

[22] Filed: Nov. 4, 1991

[30] Foreign Application Priority Data

Nov. 19, 1990 [JP] Japan .................. 2-313389

[51] Int. Cl.⁵ .............................. H01J 37/26
[52] U.S. Cl. ..................... 250/306; 250/307
[58] Field of Search .......... 250/306, 307, 423 F

[56] References Cited

U.S. PATENT DOCUMENTS

| | | | |
|---|---|---|---|
| Re. 33,387 | 10/1990 | Binnig | 250/306 |
| 4,343,993 | 8/1982 | Binnig et al. | 250/306 |
| 5,025,153 | 6/1991 | Okada et al. | 250/306 |
| 5,047,633 | 9/1991 | Finlan et al. | 250/306 |
| 5,066,858 | 11/1991 | Elings et al. | 250/307 |

OTHER PUBLICATIONS

"Scanning Tunnelling and Atomic Force Microscopy Performed With The Same Probe in One Unit", Bryant et al. Journal of Microscopy vol. 152 Pt 3 Dec. 1988 pp. 871–875.
"Scanning Tunnelling and Atomic Force Microscopy Combined" Bryant et al. Appl. Phys. Lett. 52(26), Jun. 27, 1988.
Physical Review Letters, vol. 60, No. 12, 1988, pp. 1166–1169.

Primary Examiner—Jack I. Berman
Assistant Examiner—James Beyer
Attorney, Agent, or Firm—Frishauf, Holtz, Goodman & Woodward

[57] ABSTRACT

A barrier height measuring apparatus includes a conductive cantilever with a probe which is placed close to a specimen. The cantilever is elastically deformed by the interatomic force existing between the cantilever and specimen while the cantilever is oscillated. The displacement of the cantilever against the specimen is detected while the distance between the probe and the specimen is controlled to maintain the oscillation amplitude of the cantilever to a constant level. The apparatus includes a bias source for applying a voltage of a predetermined waveform between the specimen and the cantilever to cause a tunneling current to flow between them, and an arithmetic processor for calculating the barrier height of the surface of the specimen from the tunnel current and the displacement of the cantilever.

9 Claims, 7 Drawing Sheets

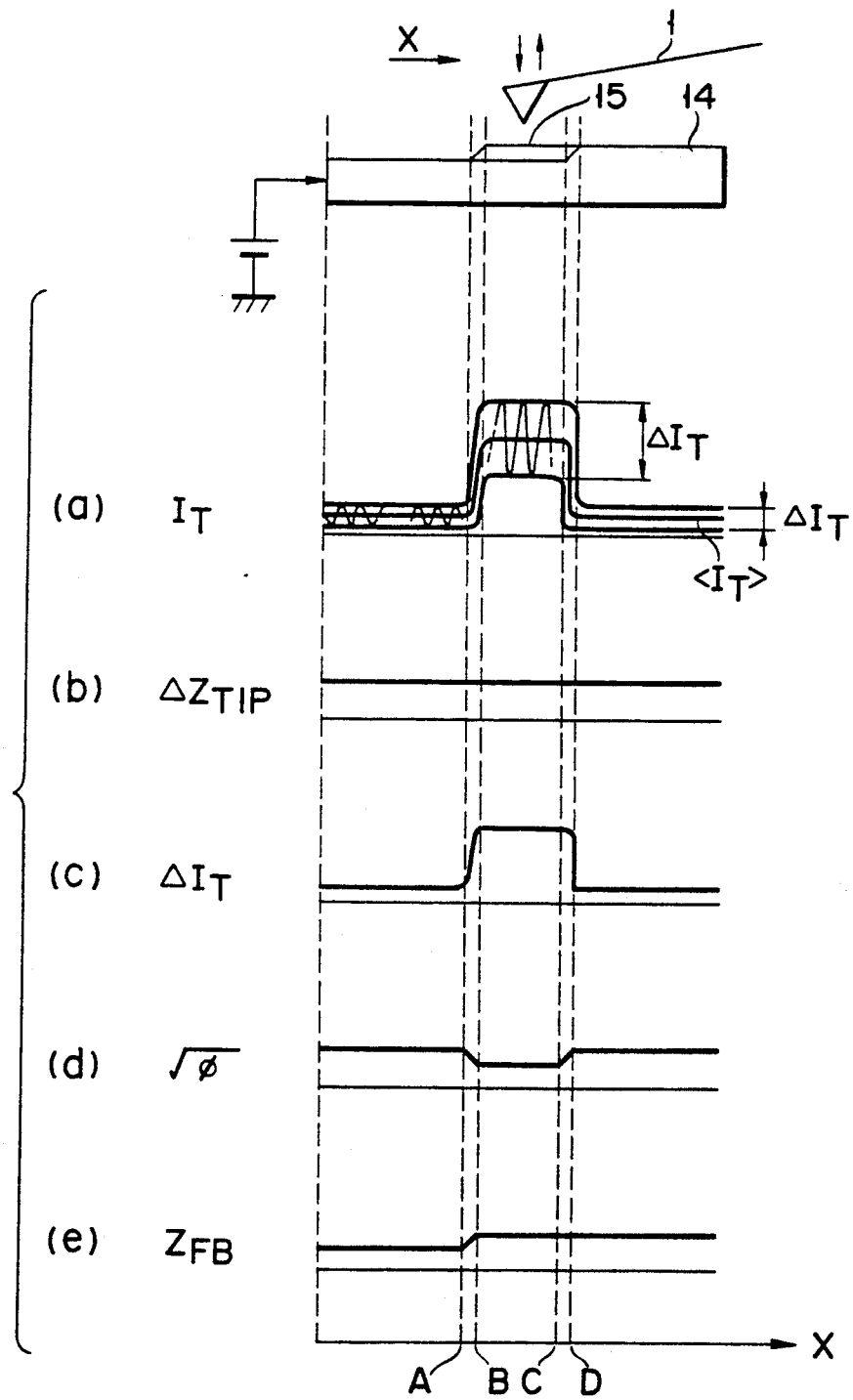
F I G. 3

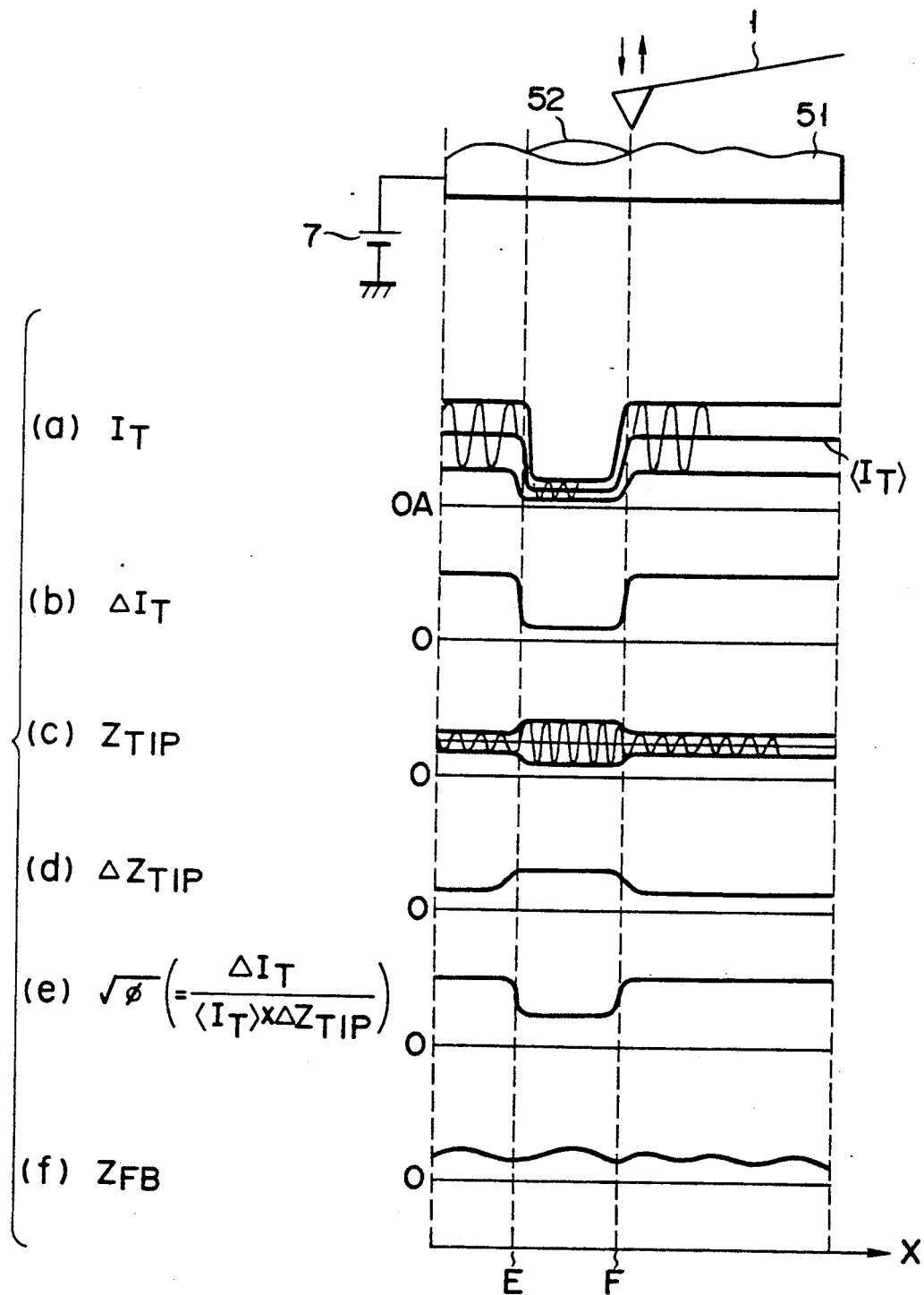
F I G. 5

BARRIER HEIGHT MEASURING APPARATUS INCLUDING A CONDUCTIVE CANTILEVER FUNCTIONING AS A TUNNELLING PROBE

BACKGROUND OF THE INVENTION

1. Field of the Invention

This invention relates to a scanning probe microscope for obtaining microscopic data on the surface of a specimen by scanning the surface with a probe held close to it and, more particularly, it relates to a barrier height measuring apparatus realized by utilizing a multifunctional scanning type probe microscope capable of obtaining two different sets of data on the surface of a same specimen.

2. Description of the Related Art

There have been known probe microscopes of varied types including the scanning tunneling microscope (STM) and the atomic force microscope (AFM).

The STM is an apparatus proposed by Binnig et. al., in U.S. Pat. No. 4,343,993 for microscopically determining the profiles of objects and reputed for its ability to determine the profiles of conductive specimens by a resolving power of atomic level.

Theoretically, this apparatus is based on the finding that a tunnel electric current flows between a pointed conductive probe and a specimen when the probe is placed very close to the surface of a conductive specimen, for example by 1 nm, and subsequently a bias voltage is applied between the probe and the specimen. The intensity of the tunneling current is expressed by formula (1) as shown below.

$$I_T = B(V_T)\exp(-A\phi^{\frac{1}{2}}S) \quad (1)$$

where $I_T$ is the intensity of the tunnel electric current, $B(V_T)$ is a coefficient dependent on the bias voltage applied to the probe and the specimen, A is a numerical coefficient equal to 10.25 $nm^{-1}(eV)^{-\frac{1}{2}}$, $\phi$ is the barrier height to be determined and S is the distance between the probe and the specimen. Since the barrier height $\phi$ of any point of a clean surface of a metal is found between 1 and 5 eV, it may be seen from the formula (1) that the intensity of the tunnel electric current can be varied by a magnitude of tens when the distance S between the probe and the specimen is varied by 0.1 nm. The probe of a STM is moved primarily horizontally along an xy plane above the specimen by a fine drive device such as a piezoelectric body to raster-scan the surface of the specimen, while it is also moved vertically or in the z direction so that the distance S between the probe and the specimen is kept constant with an accuracy of 0.01 nm to keep the intensity of the tunneling current flowing between them to be accurately constant. Thus, the probe traces an imaginary and mostly irregular surface which is identical with the surface of the specimen but separated from the latter by a given distance. Then, an STM image showing fine irregularities of the surface of the specimen will be obtained by recording the geometric locus of the tip of the probe along the xy plane and at the same time the voltage applied to the piezoelectric body to move the probe in the z direction and combining them in an appropriate manner. The tunneling current detected by the STM reflects the distance S between the specimen and the probe and at the same time the barrier height $\phi$ for a specific point of the surface of the specimen which reveals local electronic states of different surface areas of the specimen. Now, it may be appropriate to describe here briefly a barrier height $\phi$. The barrier height $\phi$ used in equation (1) above is defined by formula (2) below.

$$\phi = (\phi_1 + \phi_2)/2 \quad (2)$$

where $\phi_1$ is the ionization potential of the atoms of the material constituting the probe and $\phi_2$ is that of the atoms of the material constituting the specimen. Since the ionization potential is specific to each material, the material constituting a specific point of the surface of the specimen can be determined from the barrier height $\phi$ of that point when the material of the probe is known.

A detailed account of a method for determining the barrier height $\phi$ from the tunneling current detected by an STM is given in Physical Review Letters, Vol. 60, No. 12, 1988, pp. 1166–1169.

The method described in this paper consists in causing the probe to finely vibrate in a direction perpendicular to the surface of the specimen and detecting the distance between the specimen and the probe and at the same time the intensity of the tunneling current when the profile of the specimen is determined by a STM. In this way, the barrier height $\phi$ which is the metric differential of the intensity of the tunneling current can be obtained for each and every point of the surface of the specimen along with data on the profile of the specimen. While the signals representing the intensity of the tunneling current detected by this method contain oscillatory components, the distance between the specimen and the probe can be so controlled by a feedback control system that the average intensity of the detected tunneling current is always kept constant because the frequency of the fine oscillation is made to be much higher than the cut-off frequency of the feedback control system for controlling the distance between the specimen and the probe. Consequently, the profile of the specimen which is exactly identical with the one acquired by using an ordinary STM can be obtained from the output of the feedback control system.

The above described method for determining the profile of a specimen by utilizing a tunneling current to control the distance between the probe and the specimen and at the same time the barrier height, however, is accompanied by a drawback that they can be determined simultaneously only by means of a bias voltage that should be found within a very limited range. This is because only a limited number of electrons participate in the tunneling current flowing between the probe of the STM and the specimen, the limitation being imposed by the bias voltage, so that the level of the bias voltage by turn should be so controlled as to excite only those electrons that are found on the surface of the specimen if only the atoms on the surface of the specimen are to be effectively detected to determine the profile of the specimen. The use of a bias voltage out of a limited range does not provide any accurate data on the profile of the specimen and therefore it is not possible to determine both the profile of the specimen and the barrier height for each and every point of the surface of the specimen simultaneously if the level of the barrier voltage is in appropriate.

While the proportional relationship between the displacement of the tip of the probe in the z direction and the voltage applied to the fine drive device to move the probe is utilized when the barrier height is determined by using an STM, this technique does not ensure an accurate measurement of the barrier height since the voltage applied to the fine drive device does not necessarily accurately reflect the distance between the probe and the specimen because of the involvement of indeterminable factors in the displacement of the tip of the probe including the non-linearity of the actuator, the elastic constant of the tip of the probe and the interatomic force between the specimen and the probe.

Besides, since the method for simultaneously measuring the profile of a specimen and the barrier height for each and every point of the surface of the specimen as described above utilizes a servomechanism for controlling the distance between the probe and the specimen in order to maintain the tunneling current at a constant level, the servomechanism can bring them very close to each other until they eventually collide against each other in order to keep the tunneling current to a predetermined level if a poorly conductive object exists on the surface of the specimen.

SUMMARY OF THE INVENTION

In view of the above problems of the known methods and apparatus for measuring the barrier height for each and every point of the surface of a specimen, it is therefore the object of the present invention to provide a barrier height measuring apparatus that can accurately measure the barrier height for each and every point of the surface of a specimen by applying an appropriate bias voltage which is not subjected to any specific limitations and determine the profile of the specimen simultaneously.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a schematic illustration of signals that can be obtained by the first embodiment;

FIG. 5 is a schematic illustration of signals that can be obtained by the second embodiment;

DETAILED DESCRIPTION OF THE PREFERRED EMBODIMENTS

Now the present invention will be described in greater detail by referring to the accompanying drawings that illustrate preferred embodiments of the invention.

Figure 1:
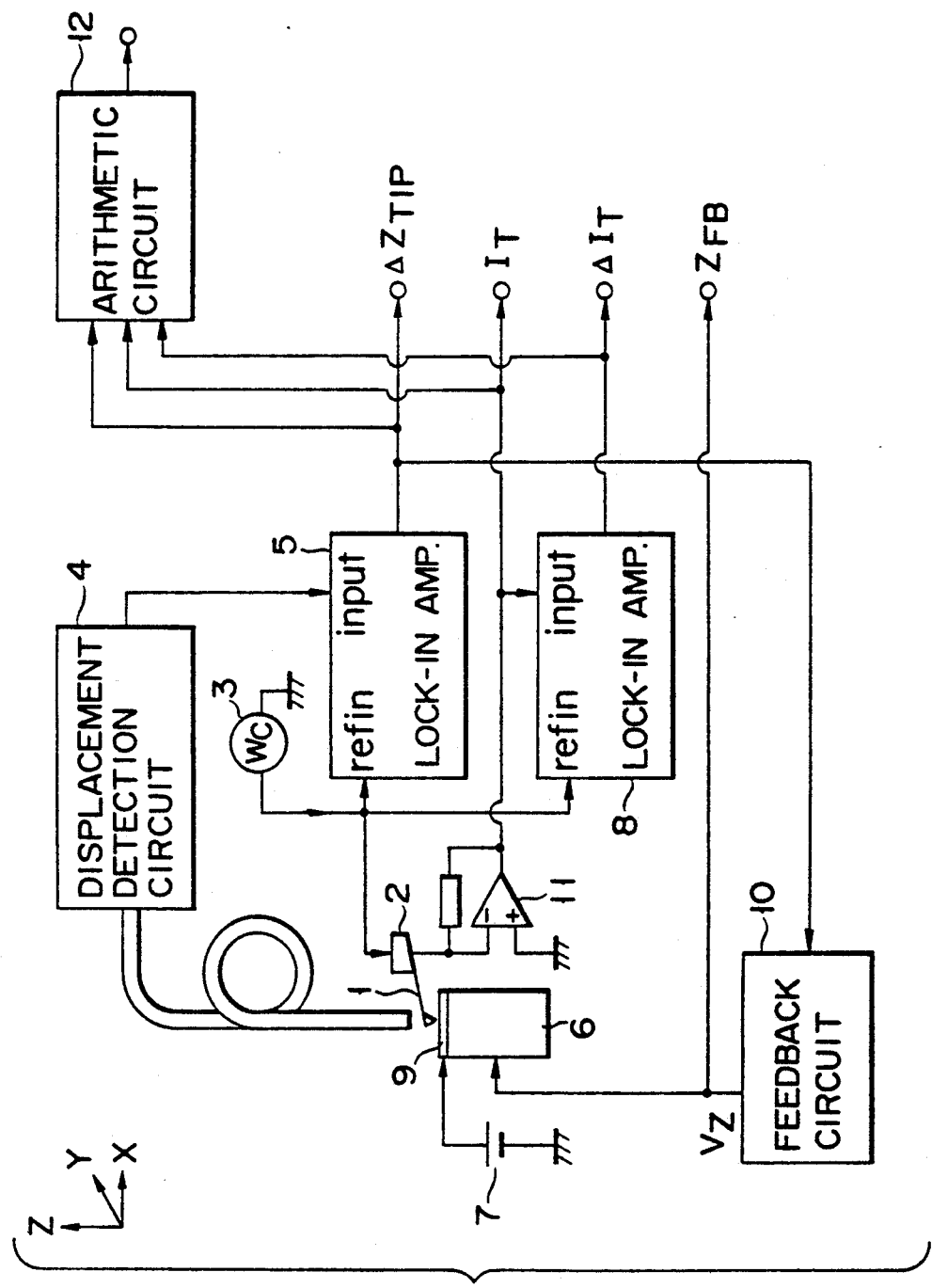
FIG. 1 is a diagram showing the configuration of a first embodiment of the invention.

FIG. 1 is a diagrammatic illustration of a first embodiment of the barrier height measuring apparatus of the invention, which comprises a cantilever 1 made of a thin conductive material, a conductive probe having a sharp tip being securely fitted to its free end and extended downward. The other end of the cantilever 1 is held by a piezoelectric actuator 2 designed to vertically vibrate the cantilever 1 in the Z-direction and the input terminal of the piezoelectric actuator 2 is electrically connected to the output terminal of an oscillator 3 that transmits signals having a given frequency of $\omega_c$. An optical displacement sensor 4 is arranged above the upper surface of the cantilever 1 and the output terminal of the displacement sensor 4 is connected to the first input terminal of a first lock-in amplifier 5, while the second input terminal of the lock-in amplifier 5 is connected to the output terminal of the oscillator 3. On the other hand, the output terminal of the first lock-in amplifier 5 is connected to the input terminal of a feedback circuit 10 and that of an arithmetic circuit 12. A metal specimen 9 is placed on an xyz piezoelectric actuator 6 which is arranged vis-a-vis the probe with a minute space provided therebetween and capable of slightly and three-dimensionally moving in the X-, Y- and Z-directions. The input terminal of said xyz piezoelectric actuator 6 is connected to the output terminal of said feedback circuit 10.

The first and second input terminals of a second lock-in amplifier 8 are respectively connected to the output terminal of the tunneling current detector circuit 11 and that of the oscillator 3, while its output terminal is connected to the input terminal of the arithmetic circuit 12.

Figure 2:
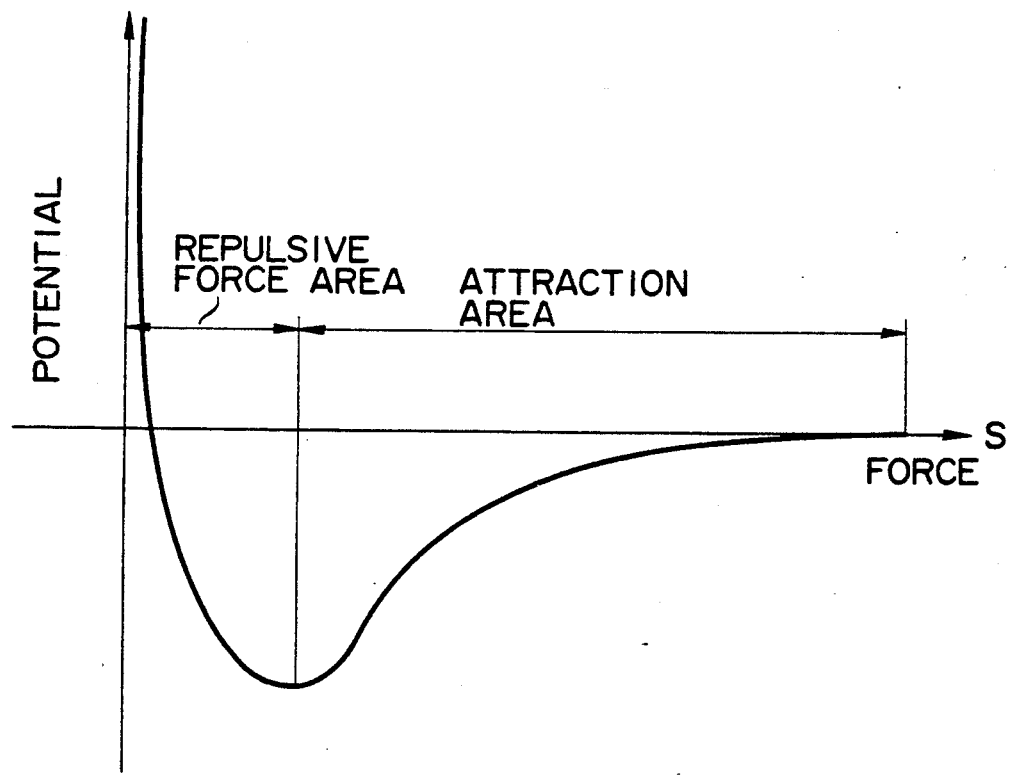
FIG. 2 is a graph showing the relationship between the interatomic force between the specimen and the probe of the first embodiment and the distance between them.

A barrier height measuring apparatus having a configuration as described above operates in the following manner to obtain data on the profile of the specimen. Electric signals having a basic frequency of $\omega_c$ are applied to the piezoelectric actuator 2 by the oscillator 3 to vertically oscillate the free end of the cantilever 1 in the Z-direction with an amplitude of about 0.1 nm. The displacement (hereinafter expressed by $Z_{TIP}$) of the front end of the cantilever 1 is sensed by the optical displacement sensor 4 for each instant of scanning and a signal representing the displacement for that instant is sent to the first lock-in amplifier 5. The output signal of the oscillator 3 is also given to the lock-in amplifier 5 as a reference signal. Consequently, the frequency of the displacement signal $Z_{TIP}$ is locked to the frequency $\omega_c$ and detected in the lock-in amplifier 5, which by turn sends out the amplitude (hereinafter expressed by $\Delta Z_{TIP}$) of the oscillation of the cantilever 1. On the other hand, as the specimen 9 is moved in the Z-direction to get closer to the probe of the cantilever 1 by the xyz piezoelectric actuator 6 arranged under the specimen, an interatomic force appears between the specimen and the probe as illustrated in FIG. 2. Thus, when the specimen 9 is moved in the X- and Y-directions and scanned by the probe while the probe is held close to the surface of the specimen, the probe is constantly subjected to an interatomic force which fluctuates as a function of the distance between the probe and the surface of the specimen. As the interatomic force is put forth to the probe, the amplitude $\Delta Z_{TIP}$ of the oscillation of the free end of the cantilever 1 is modified as a function of the interatomic force. Therefore, if the distance S between the probe and the specimen is constantly kept to a given value under the control of a servomechanism, the tip of the probe will move on an irregular surface which is identical with the surface of the specimen but separated from the latter upward by the distance S. Then, the amplitude $\Delta Z_{TIP}$ is given to the feedback circuit 10 of the embodiment, which by turn applies a voltage necessary to keep the value of the $\Delta Z_{TIP}$ constant to the element of the piezoelectric actuator 6 responsible for the movement of the specimen 9 in the Z-direction. Thus, the distance S between the specimen and the probe is kept constant and the probe traces a surface that exactly reflects the surface of the specimen 9. By synchronizing the output signal (hereinafter expressed by $Z_{FB}$) of the feedback circuit 10 for each instant during the scanning operation with the signal representing the position of the probe in terms of the X- and Y-coordinates for that instant and systematically rearranging the output signals for the entire surface of the specimen, a visual image of the surface of the specimen will be produced.

The embodiment operates in a manner as described below to determine the barrier height of a specific point of the surface of a specimen. The barrier height is a metric differential of the tunneling current and can be expressed by formula (3) below which is derived from formula (1).

$$\phi^{1/2} = \frac{2(\ln <I_T>)}{2S} \quad (3)$$
$$= (\Delta I_T <I_T>)/\Delta Z_{TIP}$$

where $<I_T>$ is the intensity of the tunneling current determined at the center of oscillation, $\Delta I_T$ is the amplitude of oscillation of the tunneling current and $\Delta Z_{TIP}$ is the amplitude of oscillation of the cantilever 1.

These values are determined by the embodiment described above. A bias voltage $V_T$ is applied to the specimen 9 by the bias power source 7. Then, the cantilever 1 and the specimen 9 will show a potential difference equal to $V_T$ as the former is connected to the tunneling current detector 11 having a 0 potential. This potential difference $V_T$ gives rise to a tunneling current $I_T$ of equation (1) between the specimen and the probe. Since the cantilever 1 is oscillating with a frequency of $\omega_c$ and an amplitude of about 0.1 nm, the detected tunneling current also provides a signal that shows an oscillation having a frequency of $\omega_c$ and a center value of $<I_T>$. As described earlier, the detected tunneling current signal $I_T$ is entered to the second lock-in amplifier 8, which detects the oscillation amplitude $\Delta I_T$ of the tunneling current by referring to the signal from the oscillator 3 having a frequency of $\omega_c$. Then, the center value $<I_T>$ of the tunneling current, the oscillation amplitude $\Delta I_T$ of the tunneling current and the oscillation amplitude $\Delta Z_{TIP}$ of the cantilever 1 are given to the arithmetic circuit 12, which carries out an arithmetic operation of formula (3) to produce a signal which is equal to the root of the barrier height $\phi$. A barrier height image of the specimen men can be obtained by calculating the barrier height $\phi$ for each instant of scanning and synchronizing it with the corresponding xy scanning signal representing the scanned spot if the barrier heights for the entire surface of the specimen are systematically gathered and rearranged.

Signals representing some of the results of a measurement conducted by using the embodiment of FIG. 1 are shown in FIG. 3.

In FIG. 3, specimen 14 is a semiconductor substrate having a metal portion 15 located on its upper surface. The metal portion 15 is arranged between point A and point D and has a slope on its upper surface between point A and point B, a flat upper surface between point B and point C and another slope on its lower surface between point C and point D to show a tapered sectional view.

Curves (a) through (e) show how the signals showed fluctuations when the specimen 14 was scanned by the probe of the embodiment. Of the curves, (a) indicates the tunneling current $I_T$ and the center value $<I_T>$ of its oscillation, (b) the oscillation amplitude $Z_{TIP}$ of the cantilever 1, (c) the oscillation amplitude $\Delta I_T$ of the tunneling current, (d) the barrier height $\phi^{\frac{1}{2}}$ calculated from $<I_T>$, $\Delta Z_{TIP}$ and $\Delta I_T$ and (e) the output signal $Z_{FB}$ of the feedback circuit 10.

When the cantilever 1 was moved above the upper surface of the specimen 14 in the X-direction relative to the latter, the front end of the cantilever 1 was displaced upward as it passed point A since the surface of the specimen showed a rise at that point. Then, the output signal $Z_{FB}$ of the feedback circuit 10 was so modified as to reduce the height, or the length in the Z-direction, of the xyz piezoelectric actuator 6 arranged under the specimen 14. Thereafter, $Z_{FB}$ remained unchanged from point B to point D to correctly reflect the surface of the specimen as indicated by (3). By seeing the detected tunneling current of (a), on the other hand, it will be understood that the rise of the tunneling current starting at point A was caused by the metal portion as the conductivity of the specimen was dramatically raised at this point to push up the center value $<I_T>$ of the oscillation of the tunneling current and, at the same time, substantially proportionally augment the oscillation amplitude $\Delta Z_{TIP}$ of the cantilever. As seen from (a), the level of the tunneling current was substantially unchanged between point B and point C where the probe was tracing the surface of the metal portion 15, whereas the center value $<I_T>$ of the oscillation of the tunneling current fell and the amplitude $\Delta I_T$ was gradually reduced as the metal portion 15 got thinner from point C to expose the semiconductor substrate 14 at point D. However, the oscillation amplitude $\Delta Z_{TIP}$ of the cantilever was kept constant all the way through the measurement as indicated by (b) due to the feedback effect of the embodiment. Thus, the root of the barrier height indicated by (d correctly reflects the electric properties of a specific point of the surface of the specimen.

It will be understood, therefore, the curve of (a) for the center value $<I_T>$ of the oscillation of the tunnel current reflecting the conductivity distribution of the specimen and that of (d) reflecting the barrier height $\phi^{\frac{1}{2}}$ of a specific point of the surface of the specimen could be obtained concurrently with the curve of (e) that shows the irregularities of the surface of the specimen by means of the embodiment.

Since the embodiment utilizes the interatomic force between the probe and the surface of the specimen for servo signals for controlling the distance between them, it is free from the problems that an accompany conventional measuring apparatus having a servomechanism utilizing a tunneling current and a bias voltage of a desired magnitude can be used for the embodiment to determine the barrier height for each and every point of the surface of a specimen. Even the specimen carries a poorly conductive body on its surface, there is no risk for the probe of the embodiment and the specimen to contact with each other. Besides, since the output from the sensor 4 accurately reflects the displacement between the specimen and the probe, the non-linearity of the piezoelectric body, the elastic constant of the probe and the probe holder and other indeterminable factors do not need to be put into consideration for the design of the embodiment.

Figure 4:
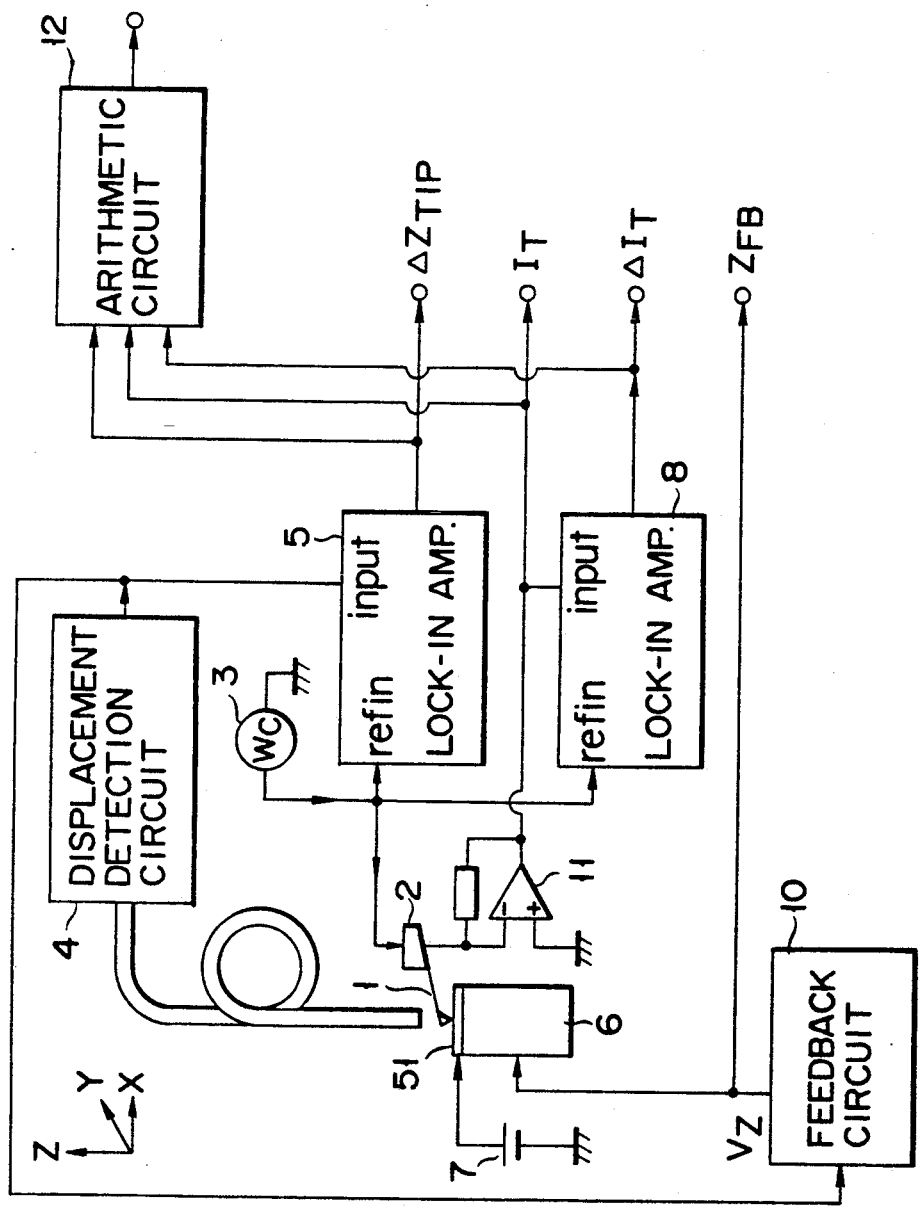
FIG. 4 is a diagram showing the configuration of a second embodiment of the invention.

FIG. 4 is a diagrammatic illustration of the configuration of a second embodiment of the barrier height measuring apparatus of the invention employing a feedback system which is different from that of the first embodiment and FIG. 5 shows signals representing some of the results of a measurement conducted by using the embodiment of FIG. 4.

The embodiment of FIG. 4 differs from the first embodiment of FIG. 1 specifically in that the input terminal of the feedback circuit 10 and the output terminal of the cantilever displacement sensor circuit 4 are directly connected with each other. Since the second embodiment is same as the first embodiment in terms of the remaining components, those components of the second embodiment will be indicated by reference numerals same as those of the first embodiment and will not be described here.

This second embodiment operates to obtain data for the profile of a specimen in a manner as described below. Its cantilever 1 is oscillated with a given constant frequency $\omega_c$ by a piezoelectric actuator 2 as in the case of the first embodiment. The displacement $Z_{TIP}$ of the free front end of the cantilever 1 is detected by the optical displacement sensor 4 arranged at the back of the cantilever 1, while its feedback circuit 10 detects the center value of the oscillation of the output signal of the displacement sensor 4 by appropriately adjusting the feedback time constant and controls the voltage to be applied for the Z-direction by the xyz piezoelectric actuator 6 supporting the specimen 51 so that the center value is kept constant. Consequently, the probe is moved above the surface of the specimen 51 in such a way that its movement reflects the irregularities of the surface of the specimen 51. Therefore, an image of the profile of the specimen can be obtained by synchronizing the output signals $Z_{FB}$ of the feedback circuit 10 with the corresponding xy scanning signals representing the scanned spots and rearranging them in a specific way.

Since the manner in which the barrier height of the surface of a specimen was actually measured for any point of the surface by this embodiment is identical with that of the first embodiment, it will not described here.

Signals representing some of the results of a measurement conducted by using the embodiment of FIG. 4 are shown in FIG. 5.

Referring to FIG. 5, the metal specimen 51 carries on it a poorly conductive body 52 between point E and point F. Curves (a) through (f) show how the signals fluctuated when the specimen 51 was scanned by the probe in the X-direction. Of the curves, (a) indicates the tunneling current $I_T$ and the center value $<I_T>$ of the oscillation of the tunneling current, (b) the oscillation amplitude $\Delta I_T$ of the tunneling current, (c) the displacement $Z_{TIP}$ of the front end of the cantilever 1, (d) the oscillation amplitude $\Delta Z_{TIP}$ of the cantilever 1, (e) (d) the barrier height $\phi^{178}$ calculated from $<I_T>$, $\Delta Z_{TIP}$ and $\Delta I_T$ and (e) the output signal $Z_{FB}$ of the feedback circuit 10.

When the cantilever 51 was moved above the upper surface of the specimen 14 in the X-direction relative to the latter, the tunneling current $I_T$ oscillated with an amplitude of $\Delta I_T$ as shown by (a), the center of oscillation being $<I_T>$ that varied as a linear function of the surface conductivity of the specimen. The output signal of the cantilever displacement sensor 4 was, on the other hand, given to the feedback circuit 10 so that the center $<Z_{TIP}>$ of the oscillation of the cantilever 1 was kept constant to maintain the interatomic force between the surface of the specimen and the probe to a constant value as indicated by (c).

When the displacement of the cantilever 1 was kept constant but the differentiated value of the interactive force between the surface of the specimen 51 and the tip of the probe varied depending on the surface condition of the specimen such as the existence of a poorly conductive body found between point E and point F, the oscillation amplitude $\Delta Z_{TIP}$ showed an increase as indicated by (c).

Thus, it will be seen that the oscillation amplitude $\Delta Z_{TIP}$ of the front end of the cantilever of the embodiment to be used to measure the barrier height for each and every point of the surface of a specimen, the average tunnel current $<I_T>$ and the oscillation amplitude $\Delta I_T$ of the tunneling current fluctuate as a function of the electric and physical properties of the surface of the specimen when a servomechanism utilizing the interatomic force between the specimen and the probe (which is so called as a repulsive force mode) is used to keep the center of oscillation of the cantilever unchanged. On the other hand, as in the case of the first embodiment, the barrier height $\phi^{\frac{1}{2}}$ that exactly reflects the electric conditions of a specific point of the surface of the specimen can be obtained by detecting the displacement of the cantilever and the oscillation amplitude of the tunneling current by means of a pair of lock-in amplifiers as well as the center value of the oscillation of the tunneling current for each point of the surface of the specimen scanned by the probe in the X- and Y-directions and using these values for calculations employing the formula (3) as cited above. The data obtained for the barrier height $\phi^{\frac{1}{2}}$ of each and every point of the surface of the specimen scanned by the probe reflects the electric condition of that point.

Thus, this second embodiment operates obviously as effectively as the first embodiment.

The lock in amplifiers of the above embodiment has an objective of measuring a specific frequency contained in the signals that appear in the measuring apparatus and, therefore, may be replaced by band-pass filters, detectors and/or selective amplifiers of various types so long as they are good for achieving the assigned objective.

Figure 6:
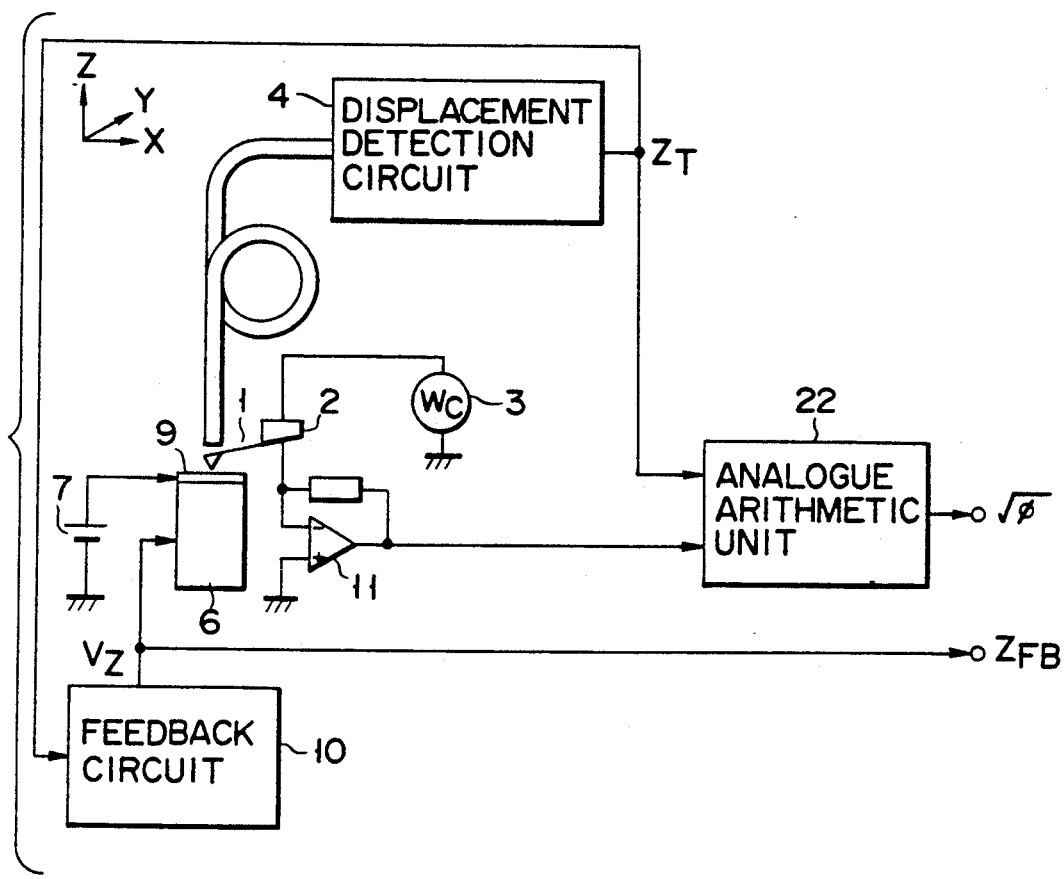
FIG. 6 is a diagram showing the configuration of a third embodiment of the invention.
Figure 7:
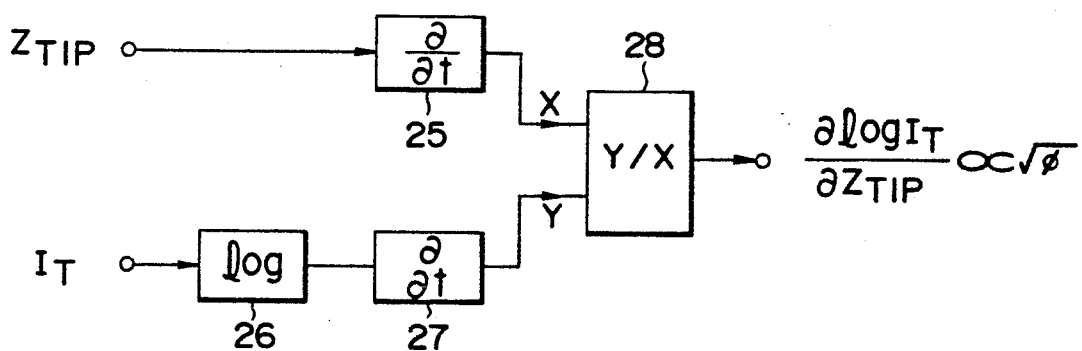
FIG. 7 is a block diagram of the analog arithmetic unit of FIG. 6.

FIG. 6 is a diagram showing the configuration of a third embodiment of the invention that comprises an analog arithmetic unit in place of a pair of lock-in amplifiers and FIG. 7 is a block diagram of the analog arithmetic unit of this embodiment.

The embodiment having a configuration as shown in FIG. 6 differs from the first embodiment of FIG. 1 in that the first lock-in amplifier 5 and the second lock-in amplifier 8 of the first embodiment are replaced by an analog arithmetic unit 22 and that the output terminal of the cantilever displacement sensor 4 is connected directly to the feedback circuit 10 in this embodiment. Since the third embodiment is same as the first embodiment in terms of the remaining components, those components of this third embodiment will be indicated by reference numerals same as those of the first embodiment and will not be described here.

This embodiment operates in the following way to determine the profile of a specimen. Referring to FIG. 6, the displacement of the front end of the cantilever 1 is detected by the cantilever displacement sensor 4 and a signal $Z_{TIP}$ representing the displacement is sent directly to the feedback circuit 10. The feedback circuit 10 can selectively perform a feedback operation of keeping the oscillation amplitude $\Delta Z_{TIP}$ of the signal $Z_{TIP}$ to a constant level which is identical as that of the first embodiment of FIG. 1 and a feedback operation of keeping the center value of the oscillation of the signal $Z_{TIP}$ constant which is identical as that of the second embodiment of FIG. 3. Therefore, this embodiment can produce an image of the profile of a specimen by recording the feedback voltage that appears during a measurement.

Now, the barrier height at any point on the surface of a specimen can be measured by using this embodiment in a manner as described below. The output $Z_{TIP}$ of the displacement sensor 4 and the tunneling current $I_T$ or the output of the current detector 11 are entered to the analog arithmetic unit 22. Referring to FIG. 7 that shows a block diagram of the analog arithmetic unit 22, the output $Z_{TIP}$ of the displacement sensor 4 is entered to a divider 28 by way of a differentiator 25 while the tunneling current $I_T$ is entered to the divider 28 by way of another differentiator 27 for arithmetic operations shown there.

Therefore, from formula (3) as shown earlier, it will be understood that both the profile of a specimen and the barrier height for each and every point of the surface can be determined simultaneously if an analog arithmetic unit is used in place of a pair of lock-in amplifiers.

It should be noted that this embodiment is advantageous in that its configuration is simpler than that of the first or second embodiment while it is as effective as any of the preceding embodiments.

The state density of the surface of a specimen can be highly dependent on the bias voltage to be used for gauging the barrier height measuring apparatus of the specimen under certain conditions. If such is the case, the bias voltage should often be varied in order to accurately determine the structure of the tunnel barrier of the specimen. Sometimes, it may even be necessary to use a voltage that induces a field emission state to determine the distance dependency of the tunneling current that appears there. A barrier height measuring apparatus according to the invention ca be effectively used to determine the state density distribution of phonons of a specimen since it is capable of obtaining data for the surface of a specimen regardless of the level of the bias voltage used there. When a barrier height measuring apparatus according to the invention is used for such an application, the constant DC power source to be used for applying a bias voltage as described earlier by referring to the first embodiment of the invention needs to be replaced by a variable voltage source so that the barrier height of the specimen may be measured for any point of the surface of the specimen by setting the voltage to a given specific level.

Figure 8:
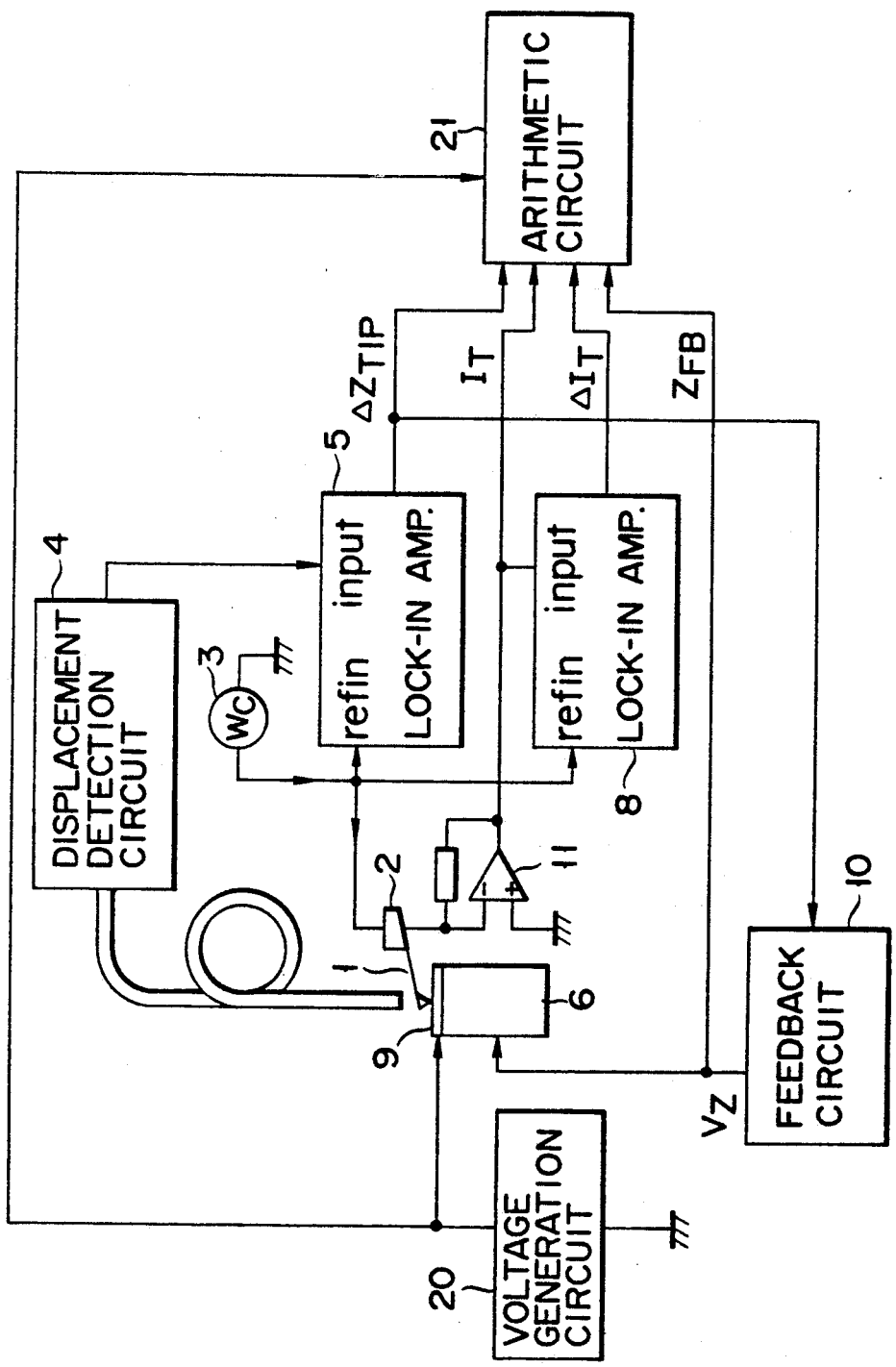
FIG. 8 is a diagram showing the configuration of a fourth embodiment of the invention.

FIG. 8 is a diagrammatic illustration of a fourth embodiment of the invention which is adaptable to such applications and therefore can be effectively used to measuring apparatus the barrier height of a specimen for any point of the surface where the state density of its surface is highly dependent on the bias voltage involved.

This embodiment is different from the first embodiment of FIG. 1 in that the bias voltage source 7 of the first embodiment is replaced by a variable waveform voltage generator 20 and that the output terminals of the first lock-in amplifier 5, the second lock-in amplifier 8, the tunneling current detector circuit 11 and the feedback circuit 10 are connected to the input terminal of the arithmetic unit 21. Since this fourth embodiment is same as the first embodiment in terms of the remaining components, those components of the fourth embodiment will be indicated by reference numerals same as those of the first embodiment and will not be described here.

The operation for determining the profile of a specimen by the fourth embodiment having a configuration as described above is similar to that of the first embodiment and therefore will not be described here.

This fourth embodiment is used to measure the barrier height for any point of the surface of a specimen in the following manner. As the surface of the specimen is scanned by the probe, the center value $<I_T>$ of the oscillation of the tunneling current and the oscillation amplitude $\Delta Z_{TIP}$ of the cantilever are given to and stored in the data processor 21 along with the voltage $V_T$ of the variable voltage generator 20 for each point of an xy plane of the specimen being scanned. The obtained data are then used for calculations by means of formula (2) to determine the barrier height $\phi$ for each point.

The obtained barrier height $\phi$ is then compared with the corresponding bias voltage $V_T$ for each point of the surface of the specimen to determine the local structure of the barrier, which by turn is utilized to discriminatively identify the material of the point.

As is apparent from the above description, a barrier height measuring apparatus according to the invention is capable of accurately determining the barrier height of any point of the surface of a specimen by applying a desired voltage between the specimen and the probe and at the same time obtaining the profile of the specimen.

For example, the bias voltage $V_T$ becomes equal to the contact electrical difference between the specimen 9 and probe 1, when the tunnel current is zero ampere, so that the information reflecting the work function of the specimen may be obtained.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A barrier height measuring apparatus comprising: a cantilever carrying a conductive probe under its free end, said probe being placed close to a specimen to be scanned by said probe, said cantilever being elastically deformable by the force exerted to said probe by the specimen placed close to said probe;

means for oscillating said cantilever in a direction perpendicular to the surface of said specimen, in a Z-direction;

means for detecting the displacement of said cantilever in the Z-direction;

servo means for controlling the distance between said specimen and said probe to maintain the oscillation amplitude of said cantilever to a constant level;

bias voltage source means for applying a voltage between said specimen and said probe to cause a tunneling current to flow between them;

means for detecting the tunneling current flowing between said probe and said specimen; and an arithmetic processor means for calculating the barrier height of each and every point of the surface of said specimen, scanned by said probe, from the tunneling current detected by said tunneling current detector means and the displacement of said cantilever detected by said cantilever detector means for the point.

2. A barrier height measuring apparatus according to claim 1, wherein said servo means and said tunneling current detector means comprise selective amplifiers.

3. A barrier height measuring apparatus according to claim 1, wherein said bias voltage source means includes means for applying a electrical signal having a predetermined wave form between the specimen and probe.

4. A barrier height measuring apparatus according to claim 1, wherein said cantilever is elastically deformed by the interatomic force existing between said cantilever and said specimen.

5. A barrier height measuring apparatus comprising:
a cantilever carrying a conductive probe under its free end, said probe being placed close to a specimen to be scanned by said probe, said cantilever being elastically deformable by the force exerted to said probe by the specimen placed close to said probe;

means for oscillating said cantilever in a direction perpendicular to the surface of said specimen in a Z-direction;

means for detecting the displacement of said cantilever in the Z-direction;

servo means for maintaining a reference point of oscillation of said cantilever constant relative to the surface of said specimen;

bias voltage source means for applying a voltage between said specimen and said probe to cause a tunneling current to flow between them;

means for detecting the tunneling current flowing between said probe and said specimen; and an arithmetic processor means for calculating the barrier height of each and every point of the surface of said specimen, scanned by said probe, from the tunneling current detected by said tunneling current detector means and the displacement of said cantilever detected by said cantilever detector means for the point.

6. A barrier height measuring apparatus according to claim 5, wherein said servo means and said tunneling current detector means comprise selective amplifiers.

7. A barrier height measuring apparatus according to claim 5, wherein said reference point of oscillation of said cantilever is the center of oscillation of said cantilever.

8. A barrier height measuring apparatus according to claim 5, wherein said bias voltage source means includes means for applying a electrical signal having a predetermined wave form between the specimen and probe.

9. A barrier height measuring apparatus comprising:
a cantilever carrying a conductive probe under its free end, said probe being placed close to a specimen to be scanned by said probe, said cantilever being elastically deformable by the force exerted to said probe by the specimen placed close to said probe;

means for oscillating said cantilever in a direction perpendicular to the surface of said specimen, in a Z-direction;

means for detecting the displacement of said cantilever in the Z-direction;

servo means for controlling the distance between said specimen and said probe to maintain the oscillation amplitude of said cantilever to a constant level;

means for applying an electrical difference having a waveform between said specimen and said probe;

means for detecting the tunneling current flowing between said probe and said specimen; and an arithmetic processor means for calculating the work function of each and every point of said specimen, scanned by said probe, from the tunneling current detected by said tunneling current detector means, the displacement of said cantilever detected by said cantilever detector means and the electrical difference having a waveform from the electrical difference applying means.

* * * * *